United States Patent [19]
Johnson

[11] 3,796,919
[45] Mar. 12, 1974

[54] POWER SUPPLY OVER VOLTAGE PROTECTION SYSTEM
[75] Inventor: Miles Carrington Johnson, Mount Holly, N.J.
[73] Assignee: RCA Corporation, New York, N.Y.
[22] Filed: May 14, 1973
[21] Appl. No.: 359,903

[52] U.S. Cl. .................. 317/16, 317/27 R, 317/31, 317/33 VR, 323/4, 323/8, 323/20
[51] Int. Cl. ............................................. H02h 3/38
[58] Field of Search .......... 323/8, 20, 4; 317/31, 16, 317/33 VR, 27 R

[56] References Cited
UNITED STATES PATENTS
3,303,411   2/1967   Gately..................................... 323/20
3,538,423   11/1970  Goleniewski............................ 323/4
3,414,803   12/1968  Glasgow................................. 323/20
3,602,804   8/1971   Randall................................... 323/20

Primary Examiner—J. D. Miller
Assistant Examiner—Harvey Fendelman
Attorney, Agent, or Firm—Edward J. Norton; Joseph S. Tripoli

[57] ABSTRACT

A power supply system is disclosed having a plurality of voltage regulator circuits connected in parallel with each other between a source of unregulated voltage and a load. Each of the voltage regulators includes an over voltage protection circuit whereby a particular regulator is taken out of service when the current in that regulator exceeds a certain level and the voltage across the load is at a first level. The regulator is not taken out of service when the current through the regulator is below the certain level and the voltage across the load is above the first level but below a second, higher, level.

7 Claims, 3 Drawing Figures

PATENTED MAR 12 1974　　　　　　　　　　　　　　3,796,919

POWER SUPPLY OVER VOLTAGE PROTECTION SYSTEM

The invention herein described was made in the course of or under a contract or subcontract thereunder with the Department of the Navy.

The present invention relates to power supply systems in general and more particularly to parallel connected voltage regulator circuits having over voltage protection circuits.

There are many applications where it is desirable to connect a plurality of voltage regulated power supplies in parallel with each other between a pair of input terminals and a pair of output terminals. One of the reasons for connecting voltage regulators in parallel is to provide fail safe operation of the supply system. That is, if one regulator should fail, the remaining voltage regulators will pick up the load. Another reason for paralleling supplies is to achieve greater output power.

One approach to paralleling supplies is to parallel their output terminals directly as opposed to going through an OR circuit which dissipates a significant amount of power. When supplies are paralleled directly, the problem arises as to the manner in which one may recognize which supply has failed in the group in the event of such a failure.

If a power supply in a group of directly paralleled supplies is causing an over voltage condition as a result of a malfunction within itself, then more than the required output current will be supplied to the load and the output voltage of the other, functional, supplies will be raised to a voltage above which the supplies are intended to regulate. The functional supplies will attempt to reduce this output voltage to the desired level. However, since the failed supply maintains the higher output voltage presented to the other regulators, the control loops of the functional regulators will reduce their individual output currents to zero. Thus, without appropriate circuitry the entire power supply system is taken out of service due to the over voltage condition when only one of the directly paralleled regulators is malfunctioning as described above.

If the over voltage is the result of a load fault condition, than all of the directly paralled supplies should be shut down. Hence, the desired over voltage protection, for directly paralleled voltage regulators, should be one that removes a particular supply from service when the fault is internal thereto without taking the remaining, functioning, supplies out of service. The protective circuitry should in addition be capable of removing all of the supplies from service and suppressing the over voltage condition in the presence of a load fault or in the presence of an external source of voltage being placed across the load terminals.

The present invention provides the aforementioned type of over voltage protection for a power supply system comprising a plurality of parallel connected voltage regulated circuits connected between a source of unregulated voltage and a load. In accordance with the present invention each of the paralleled voltage regulator circuits comprises an output current sensor for providing a first signal when a certain output current level is exceeded, an internal over voltage sensor for providing a second signal when the load voltage exceeds a first level and an external over voltage sensor for providing a third signal when the load voltage exceeds a second level. In addition, means responsive to the first, second and third signals is provided which shuts down the regulator when the first and the second or third signal is present while maintaining the regulator operative in the presence of only the first or second signal.

Figure 1:
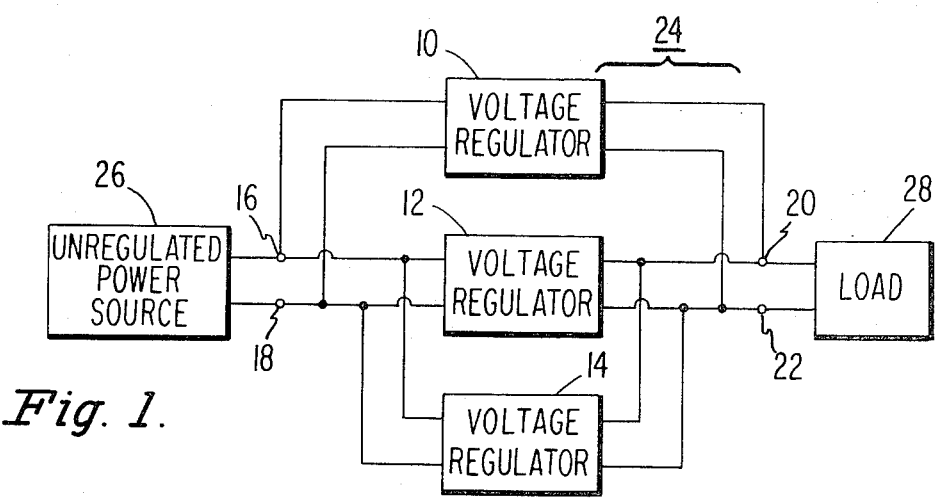
FIG. 1 is a block diagram of one embodiment of a paralleled power supply system.

Referring now to FIG. 1, a plurality of voltage regulator circuits 10, 12 and 14 are directly connected in parallel between a pair of input terminals 16 and 18 and a pair of output terminals 20 and 22 forming a power supply system 24. Input terminals 16 and 18 are adapted for connection to a source of unregulated voltage 26 and output terminals 20 and 22 are adapted for connection to a load 28. Source 26 may be a D.C. source or an A.C. rectified source. Load 28 is representative of any load or a plurality of loads requiring a regulated voltage.

Although three voltage regulators 10, 12 and 14 are shown in FIG. 1, it will be understood that any number of regulators may be placed in parallel in the practice of the present invention. It will further be understood in the practice of the present invention that regulator circuits 10, 12 and 14 may each be preceded by separate unregulated power sources such as 26 which then moves the paralleling terminals 16 and 18 to the input terminals of the separate unregulated sources.

Figure 2:
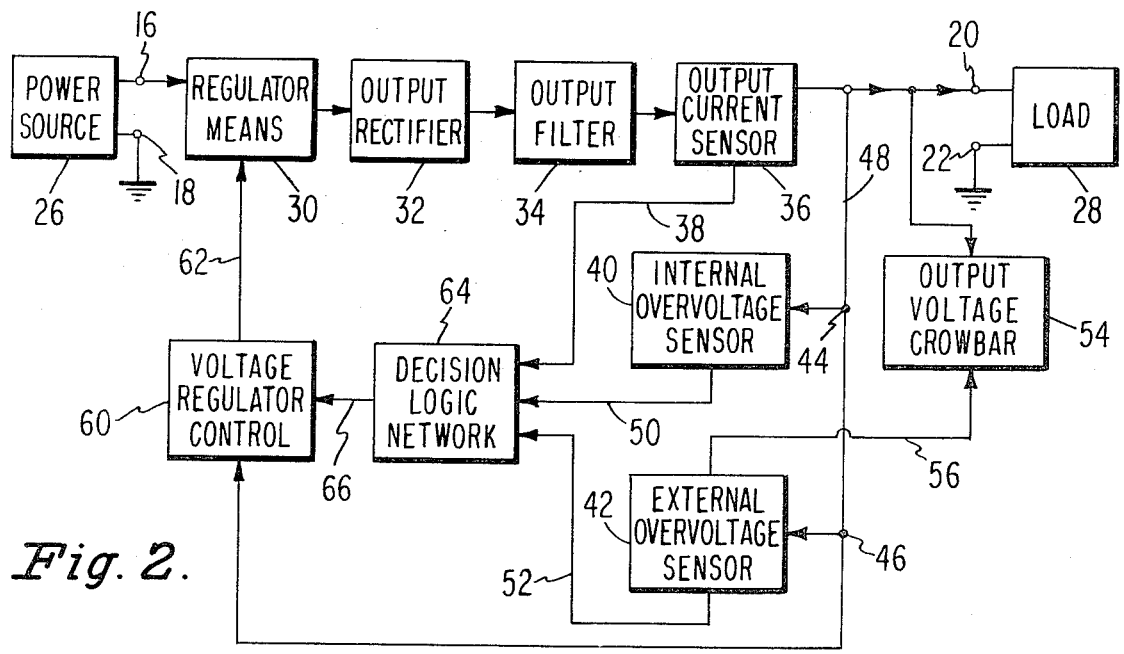
FIG. 2 is a block diagram of one of the voltage regulator circuits used in the parallel supply system of FIG. 1.

FIG. 2 shows the elements contained in each of the voltage regulators 10, 12 and 14, all of the aforementioned voltage regulator circuits being similar in construction.

The power source 26 delivers an unregulated voltage to a regulator means 30. In the present embodiment regulator means 30 is the main regulating element in a switching type regulator circuit. That is, regulator 30 is made to switch on and off in accordance with conditions at the output terminals 20 and 22 during normal operation. The regulator means 30 does not necessarily have to be of the switching type in the practice of the present invention and in fact may be a series or shunt variable impedance or switching type regulator means.

The signals developed in the regulator means 30 are delivered to an output rectifier circuit 32, which in the present embodiment is intended to have the form of a full wave diode bridge rectifier. The rectified signals from the rectifier circuit 32 are delivered to an output filter 34. The filtered signals are then delivered to an output current sensor 36. Although output current sensor 36 is shown following output filter 34 in FIG. 2, it will be understood that it may precede output filter 34 and sense the average output current in the practice of the present invention.

Current sensor 36 both senses the current delivered to the load and provides an output signal on line 38 when the current delivered to the load 28 exceeds a certain adjustable preset level. Current sensor 36 may take the form of a current sensing device in combination with an operational amplifier and an adjustable reference level means. Thus, any particular circuitry may be used for current sensor 36 which will sense the output current and provide a signal, in this case digital in nature, when the current delivered to the load 28 exceeds a certain threshold level.

In addition there is provided an internal over voltage sensor 40 and an external over voltage sensor 42. Both of the aforementioned sensors have an input signal related to the voltage across the load 28 provided at input terminals 44 and 46 respectively over line 48. Sensors 40 and 42 are similar in construction to sensor 36 in that each one provides an output signal when a certain threshold level is exceeded.

Sensor 40 is set, say by adjusting the reference level (not shown) to provide a digital signal on line 50 when the voltage across the load 28 exceeds a first level. Sensor 42 is set, by adjusting its reference level (not shown) to provide a digital signal on line 52 when the voltage across the load 28 exceeds a second level. The second voltage level is higher than the first level. Thus, sensors 40 and 42 define two circuits which sense the output voltage and provide a first digital signal on line 50 when the output voltage exceeds one level and a second digital signal is provided on line 52 when the output voltage exceeds a second, higher, voltage level.

In addition, external over voltage sensor 42 provides a digital signal, via line 56, to the output voltage crowbar circuit 54 when the threshold level for sensor 42 is exceeded. Crowbar circuit 54 is effectively connected across the load 28 via line 58. Thus, when the external over voltage threshold level is exceeded, the crowbar circuit 54 is activated via the signal on line 56 and a low impedance path is placed across the load 28 for protection purposes.

Line 48, which senses the output voltage, is also connected to the voltage regulator control unit 60. Control unit 60 comprises those circuits, in analog form, which control the conduction of the regulator means 30 via line 62.

Under normal operation the control unit 60 will compare the analog voltage representing the output voltage to a reference voltage and then adjust the state of conduction or the duty cycle of the regulator means 30 to provide the desired regulated output voltage to the load 28.

In addition, the voltage regulating circuit of FIG. 2 provides a decision logic network 64, having input signals provided from lines 38, 50 and 52 and an output line 66 connected to the voltage regulator control circuit 60. Network 64, which is a digital network, performs the logical decision task as to when the particular voltage regulator in the parallel system 24 should be taken out of service.

When network 64 is provided with a signal on line 50 from sensor 40 and no other signals are provided on lines 38 and 52, then only the internal over voltage threshold or voltage has been exceeded and this particular supply should remain in service. Thus, no shut off signal is provided on line 66. Under these conditions the over voltage is probably due to some fault other than one generated inside of the regulator circuit under consideration.

When network 64 is provided with signals on lines 38 and 50, from the current sensor 36 and the internal over voltage sensor 40, then a shut off signal is provided on line 66 and the regulator control 60 is made to turn off the regulator 30 in response thereto. Under these conditions, i.e. where the regulator circuit is delivering an output current and the first threshold level is exceeded, the particular voltage regulator circuit is probably at fault and should be shut down.

Whenever the network 64 sees a signal on line 52 from the external over voltage sensor, regardless of the existence of signals on lines 38 or 50, the particular regulator should be and is shut off by the generation of a signal on line 66. Under these conditions there is probably a system failure and all regulator means such as 30 in the system should be made non-conductive.

In addition, when the external over voltage threshold is exceeded, the load should be protected and thus the crowbar circuit 54 is made active via a signal on line 56.

Figure 3:
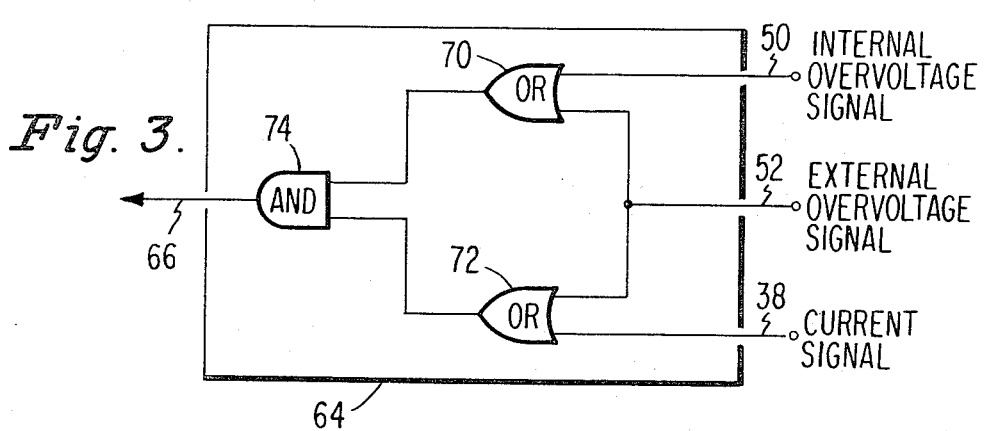
FIG. 3 is a simplified schematic diagram of a logic circuit used in the regulator shown in FIG. 2.

A simplified arrangement of the logic network 64 is shown in FIG. 3 comprising a pair of OR gates 70 and 72 whose output terminals are connected to the input terminals of AND gate 74. The signals on lines 50 and 52 are provided at the input terminals of OR gate 70 while the signals on lines 38 and 52 are provided at the input terminals of OR gate 72. The output terminals of AND gate 74 is coupled to line 66.

The logic network 64 is thus arranged to provide a signal on line 66 whenever a signal is present on line 52. Network 64 also provides a shut off signal on line 66 when signals are present on lines 38 and 50. Network 64 does not provide the shut off signal when signals appear only on line 50 or only on line 38.

It will be recalled that each of the regulator circuits 10, 12 and 14 in the paralleled system 24 contain the circuitry described in FIGS. 2 and 3. Thus, there is provided a parallel power supply system which selectively removes individual supplies or all of the supplies from service depending upon the particular fault condition.

What is claimed is:

1. In a power supply system comprising a plurality of voltage regulator circuits connected in parallel with each other, each of said voltage regulator circuits comprising a regulator means and a feedback control loop adapted for connection between a source of unregulated voltage and a load, each of said voltage regulator circuits further having an over voltage protection circuit comprising:
   an output current sensor for providing a first signal when the current provided to said load exceeds a certain level;
   an internal over voltage sensor for providing a second signal when the voltage across said load exceeds a first level;
   an external over voltage sensor for providing a third signal when the voltage across said load exceeds a second level;
   means responsive to said first, second and third signals for shutting down said regulator means in the presence of said first and second signals or in the presence of said third signal, and for maintaining said regulator means operative in the presence of only said second signal or in the presence of only said first signal.

2. The system according to claim 1 wherein said second voltage level is greater than said first voltage level.

3. The system according to claim 2 wherein said over voltage protection circuit further comprises a crowbar circuit means connected across said load and responsive to said third signal for providing a conductive path shunting said load when the voltage across said load exceeds said second level.

4. The system according to claim 3 wherein said means responsive to said first, second and third signals comprises a logic circuit having first and second OR circuits coupled through an AND circuit, said logic circuit having input terminals connected to said output current sensor, said internal over voltage sensor and said external over voltage sensor and an output terminal connected to said feedback control loop.

5. A power supply system comprising a plurality of voltage regulator circuits connected in parallel with each other, the parallel combination being adapted for connection between a source of unregulated voltage and a load, each one of said regulator circuits comprising:

a regulator means connected between said source of unregulated voltage and said load, an analog signal control loop connected between said load and said regulator means for controlling the conduction of current through said regulator means;

an over voltage control loop for providing a digital signal to said analog control loop in response to a certain current level supplied to said load and a first voltage level appearing across said load;

said analog control loop rendering said regulator means non-conductive in response to said digital signal;

said over voltage control loop further providing another digital signal to said analog control loop when the voltage appearing across said load is at a second level;

said analog control loop rendering said regulator means non-conductive in response to said other digital signal.

6. The system according to claim 5 wherein said second voltage level is greater than said first voltage level.

7. The system according to claim 6 further comprising a crowbar circuit means located in each of said voltage regulator circuits, connected across said load, and responsive to said second voltage level for providing a conductive path shunting said load.

* * * * *